US008858892B2

(12) United States Patent
Janssen et al.

(10) Patent No.: US 8,858,892 B2
(45) Date of Patent: Oct. 14, 2014

(54) LIQUID TREATMENT SYSTEM

(75) Inventors: Robert Allen Janssen, Alpharetta, GA (US); John G. Ahles, Neenah, WI (US); Robert A. Cool, Alpharetta, GA (US); Thomas David Ehlert, Neenah, WI (US); John Gavin MacDonald, Decatur, GA (US); Earl C. McCraw, Jr., Duluth, GA (US); Patrick Sean McNichols, Hortonville, WI (US); Paul W. Rasmussen, Neenah, WI (US); Steve J. Roffers, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1043 days.

(21) Appl. No.: 11/963,139

(22) Filed: Dec. 21, 2007

(65) Prior Publication Data

US 2009/0162258 A1   Jun. 25, 2009

(51) Int. Cl.
| B01J 19/08 | (2006.01) |
| B01J 19/00 | (2006.01) |
| B01J 19/10 | (2006.01) |
| C02F 1/72 | (2006.01) |
| C02F 1/36 | (2006.01) |
| C02F 1/78 | (2006.01) |
| C02F 1/32 | (2006.01) |
| B01J 19/12 | (2006.01) |

(52) U.S. Cl.
CPC ............ B01J 19/10 (2013.01); C02F 2303/04 (2013.01); B01J 19/008 (2013.01); C02F 2201/3228 (2013.01); C02F 2201/326 (2013.01); C02F 2305/023 (2013.01); C02F 1/722 (2013.01); C02F 1/36 (2013.01); C02F 1/78 (2013.01); C02F 1/325 (2013.01); B01J 19/123 (2013.01)
USPC ........ 422/186.3; 181/175; 181/177; 181/142; 181/192; 381/337; 381/340

(58) Field of Classification Search
CPC ......... B01J 19/008; B01J 19/10; C02F 1/325; C02F 1/36
USPC ............... 422/186.3; 181/175, 177, 142, 192; 381/337, 340
See application file for complete search history.

(56) References Cited

U.S. PATENT DOCUMENTS

| 2,115,056 A | 4/1938 | Samuel |
| 2,307,206 A | 1/1943 | Fischer |

(Continued)

FOREIGN PATENT DOCUMENTS

| CA | 2175065 | 5/1995 |
| CH | 657067 | 8/1986 |

(Continued)

OTHER PUBLICATIONS

Non-final Office Action received in U.S. Appl. No. 11/966,458 mailed Sep. 28, 2010.

(Continued)

Primary Examiner — Xiuyu Tai
(74) Attorney, Agent, or Firm — Armstrong Teasdale LLP

(57) ABSTRACT

A liquid treatment system has a housing defining an interior space. The housing has an inlet port for receiving liquid into the interior space of the housing and an outlet port for allowing liquid to exit the interior space of the housing. The outlet port is spaced from the inlet port so that liquid flows through the interior space of the housing from the inlet port to the outlet port. An ultrasonic waveguide assembly is disposed within the interior space of the housing and includes an ultrasonic horn disposed at least in part intermediate the inlet port and the outlet port of the housing. The ultrasonic horn is operable at an ultrasonic frequency to ultrasonically energize liquid flowing within the housing. An ultraviolet light source emits ultraviolet light into the interior space of the housing to treat liquid flowing therein.

17 Claims, 3 Drawing Sheets

(56) References Cited

U.S. PATENT DOCUMENTS

| | | | |
|---|---|---|---|
| 2,584,053 A | 1/1952 | Seavey et al. |
| 2,615,692 A | 10/1952 | Muller |
| 2,620,894 A | 12/1952 | Peterson et al. |
| 2,661,192 A | 12/1953 | Horsley et al. |
| 2,946,981 A | 7/1960 | O'Neill |
| 3,066,232 A | 11/1962 | Branson |
| 3,160,138 A | 12/1964 | Platzman |
| 3,202,281 A | 8/1965 | Weston |
| 3,239,998 A | 3/1966 | Carter et al. |
| 3,246,881 A | 4/1966 | Davidson et al. |
| 3,249,453 A | 5/1966 | Schnoring et al. |
| 3,273,631 A | 9/1966 | Neuman |
| 3,275,787 A | 9/1966 | Newberry |
| 3,278,165 A | 10/1966 | Gaffney |
| 3,284,991 A | 11/1966 | Ploeger et al. |
| 3,325,348 A | 6/1967 | Bennett |
| 3,326,470 A | 6/1967 | Loudin et al. |
| 3,338,992 A | 8/1967 | Kinney |
| 3,341,394 A | 9/1967 | Kinney |
| 3,425,951 A | 2/1969 | Ishiwata |
| 3,463,321 A | 8/1969 | VanIngen |
| 3,479,873 A | 11/1969 | Hermanns |
| 3,490,584 A | 1/1970 | Balamuth |
| 3,502,763 A | 3/1970 | Hartman |
| 3,519,251 A | 7/1970 | Nystrom et al. |
| 3,542,345 A | 11/1970 | Kuris |
| 3,542,615 A | 11/1970 | Dobo et al. |
| 3,567,185 A | 3/1971 | Ross et al. |
| 3,591,946 A | 7/1971 | Loe |
| 3,664,191 A | 5/1972 | Hermanns |
| 3,692,618 A | 9/1972 | Dorschner et al. |
| 3,782,547 A | 1/1974 | Dieter |
| 3,802,817 A | 4/1974 | Matsuki et al. |
| 3,865,350 A | 2/1975 | Burtis |
| 3,873,071 A | 3/1975 | Tatebe |
| 3,904,392 A | 9/1975 | VanIngen et al. |
| 4,035,151 A | 7/1977 | Czerny et al. |
| 4,062,768 A | 12/1977 | Elliot |
| 4,070,167 A | 1/1978 | Barbee et al. |
| 4,122,797 A | 10/1978 | Kawamura et al. |
| 4,168,295 A | 9/1979 | Sawyer |
| 4,218,221 A | 8/1980 | Cottell |
| 4,249,986 A | 2/1981 | Obeda |
| 4,259,021 A | 3/1981 | Goudy, Jr. |
| 4,260,389 A | 4/1981 | Lister |
| 4,266,879 A | 5/1981 | McFall |
| 4,340,563 A | 7/1982 | Appel et al. |
| 4,372,296 A | 2/1983 | Fahim |
| 4,398,925 A | 8/1983 | Trinh et al. |
| 4,425,718 A | 1/1984 | Kawaguchi |
| 4,511,254 A | 4/1985 | North et al. |
| 4,556,467 A | 12/1985 | Kuhn |
| 4,612,016 A | 9/1986 | Jaeger et al. |
| 4,612,018 A | 9/1986 | Tsuboi et al. |
| 4,663,220 A | 5/1987 | Wisneski et al. |
| 4,673,512 A | 6/1987 | Schram |
| 4,693,879 A | 9/1987 | Yoshimura et al. |
| 4,699,636 A | 10/1987 | Bofinger et al. |
| 4,706,509 A | 11/1987 | Riebel |
| 4,708,878 A | 11/1987 | Hagelauer et al. |
| 4,726,522 A | 2/1988 | Kokubo et al. |
| 4,743,361 A | 5/1988 | Schram |
| 4,848,159 A | 7/1989 | Kennedy et al. |
| 4,877,516 A | 10/1989 | Schram |
| 4,879,011 A | 11/1989 | Schram |
| 4,929,279 A | 5/1990 | Hays |
| RE33,524 E | 1/1991 | Schram |
| 4,983,045 A | 1/1991 | Taniguchi |
| 5,006,266 A | 4/1991 | Schram |
| 5,026,167 A | 6/1991 | Berliner, III |
| 5,032,027 A | 7/1991 | Berliner, III |
| 5,059,249 A | 10/1991 | Hays |
| 5,096,532 A | 3/1992 | Neuwirth et al. |
| 5,110,403 A | 5/1992 | Ehlert |
| 5,122,165 A | 6/1992 | Wang et al. |
| 5,164,094 A | 11/1992 | Stuckart |
| 5,169,067 A | 12/1992 | Matsusaka et al. |
| 5,242,557 A | 9/1993 | Jones et al. |
| 5,258,413 A | 11/1993 | Isayev |
| 5,269,297 A | 12/1993 | Weng et al. |
| 5,326,164 A | 7/1994 | Logan |
| 5,330,100 A | 7/1994 | Malinowski |
| 5,335,449 A | 8/1994 | Beatty |
| 5,372,634 A | 12/1994 | Monahan |
| 5,373,212 A | 12/1994 | Beau |
| 5,375,926 A | 12/1994 | Omasa |
| 5,391,000 A | 2/1995 | Taniguchi |
| 5,466,722 A | 11/1995 | Stoffer et al. |
| 5,519,670 A | 5/1996 | Walter |
| 5,536,921 A | 7/1996 | Hedrick et al. |
| 5,583,292 A | 12/1996 | Karbach et al. |
| 5,585,565 A | 12/1996 | Glascock et al. |
| 5,665,383 A | 9/1997 | Grinstaff et al. |
| 5,681,457 A | 10/1997 | Mahoney |
| 5,711,888 A | 1/1998 | Trampler et al. |
| 5,770,124 A | 6/1998 | Marecki et al. |
| 5,803,270 A | 9/1998 | Brodeur |
| 5,810,037 A | 9/1998 | Sasaki et al. |
| 5,831,166 A | 11/1998 | Kozuka et al. |
| 5,853,456 A | 12/1998 | Bryan et al. |
| 5,868,153 A | 2/1999 | Cohen et al. |
| 5,873,968 A | 2/1999 | Pike et al. |
| 5,902,489 A | 5/1999 | Yasuda et al. |
| 5,916,203 A | 6/1999 | Brandon et al. |
| 5,922,355 A | 7/1999 | Parikh et al. |
| 5,935,883 A | 8/1999 | Pike |
| 5,937,906 A | 8/1999 | Kozyuk |
| 5,964,926 A | 10/1999 | Cohen |
| 5,979,664 A | 11/1999 | Brodeur |
| 6,010,592 A | 1/2000 | Jameson et al. |
| 6,020,277 A | 2/2000 | Jameson |
| 6,035,897 A | 3/2000 | Kozyuk |
| 6,053,028 A | 4/2000 | Kraus, Jr. et al. |
| 6,053,424 A | 4/2000 | Gipson et al. |
| 6,055,859 A | 5/2000 | Kozuka et al. |
| 6,060,416 A | 5/2000 | Kobata |
| 6,074,466 A | 6/2000 | Iwasa |
| 6,090,731 A | 7/2000 | Pike et al. |
| 6,106,590 A | 8/2000 | Ueno et al. |
| 6,169,045 B1 | 1/2001 | Pike et al. |
| 6,200,486 B1 | 3/2001 | Chahine et al. |
| 6,218,483 B1 | 4/2001 | Muthiah et al. |
| 6,221,258 B1 | 4/2001 | Feke et al. |
| 6,254,787 B1 | 7/2001 | Kimura et al. |
| 6,266,836 B1 | 7/2001 | Gallego Juarez et al. |
| 6,315,215 B1 | 11/2001 | Gipson et al. |
| 6,322,240 B1 | 11/2001 | Omasa |
| 6,332,541 B1 | 12/2001 | Coakley et al. |
| 6,361,697 B1 | 3/2002 | Coury et al. |
| 6,368,414 B1 | 4/2002 | Johnson |
| 6,380,264 B1 | 4/2002 | Jameson et al. |
| 6,383,301 B1 | 5/2002 | Bell et al. |
| 6,450,417 B1 | 9/2002 | Gipson et al. |
| 6,467,350 B1 | 10/2002 | Kaduchak et al. |
| 6,482,327 B1 | 11/2002 | Mori et al. |
| 6,506,584 B1 | 1/2003 | Chandler et al. |
| 6,547,903 B1 | 4/2003 | McNichols et al. |
| 6,547,935 B2 | 4/2003 | Scott |
| 6,547,951 B1 | 4/2003 | Maekawa |
| 6,551,607 B1 | 4/2003 | Minerath, III |
| 6,576,042 B2 | 6/2003 | Kraus et al. |
| 6,582,611 B1* | 6/2003 | Kerfoot ........................ 210/747 |
| 6,593,436 B2 | 7/2003 | Austin et al. |
| 6,605,252 B2 | 8/2003 | Omasa |
| 6,617,588 B1 | 9/2003 | Sato |
| 6,620,226 B2 | 9/2003 | Hutton et al. |
| 6,624,100 B1 | 9/2003 | Pike et al. |
| 6,627,265 B2 | 9/2003 | Kutilek |
| 6,655,826 B1 | 12/2003 | Leanos |
| 6,659,365 B2 | 12/2003 | Gipson et al. |
| 6,676,003 B2 | 1/2004 | Ehlert et al. |
| 6,689,730 B2 | 2/2004 | Hortel et al. |
| 6,739,524 B2 | 5/2004 | Taylor-McCune et al. |
| 6,770,600 B1 | 8/2004 | Lamola |

(56) References Cited

U.S. PATENT DOCUMENTS

| | | | |
|---|---|---|---|
| 6,817,541 B2 | 11/2004 | Sands et al. | |
| 6,818,128 B2 | 11/2004 | Minter | |
| 6,837,445 B1 | 1/2005 | Tsai | |
| 6,841,921 B2 | 1/2005 | Stegelmann | |
| 6,858,181 B2 | 2/2005 | Aoyagi | |
| 6,878,288 B2 | 4/2005 | Scott | |
| 6,883,724 B2 | 4/2005 | Adiga et al. | |
| 6,890,593 B2 | 5/2005 | Tian | |
| 6,897,628 B2 | 5/2005 | Gunnerman | |
| 6,902,650 B2 | 6/2005 | Park et al. | |
| 6,911,153 B2 * | 6/2005 | Minter | 210/748.02 |
| 6,929,750 B2 | 8/2005 | Laurell et al. | |
| 6,935,770 B2 | 8/2005 | Schueler | |
| 6,936,151 B1 | 8/2005 | Lock | |
| 7,018,546 B2 | 3/2006 | Kurihara et al. | |
| 7,083,322 B2 | 8/2006 | Moore et al. | |
| 7,083,764 B2 | 8/2006 | Scott | |
| 7,090,391 B2 | 8/2006 | Taniguchi | |
| 7,108,137 B2 | 9/2006 | Lal et al. | |
| 7,150,779 B2 | 12/2006 | Meegan, Jr. | |
| 7,156,201 B2 * | 1/2007 | Peshkovskiy et al. | 310/323.19 |
| 7,293,909 B2 | 11/2007 | Taniguchi | |
| 7,322,431 B2 | 1/2008 | Ratcliff | |
| 7,338,551 B2 | 3/2008 | Kozyuk | |
| 7,404,666 B2 | 7/2008 | Tessien | |
| 7,414,009 B2 | 8/2008 | Tanaka et al. | |
| 7,419,519 B2 | 9/2008 | Li et al. | |
| 7,424,883 B2 | 9/2008 | McNichols et al. | |
| 7,465,426 B2 | 12/2008 | Kerherve et al. | |
| 7,504,075 B2 | 3/2009 | Marhasin | |
| 7,516,664 B2 | 4/2009 | Meier et al. | |
| 7,533,830 B1 | 5/2009 | Rose | |
| 7,582,156 B2 | 9/2009 | Tanaka et al. | |
| 7,673,516 B2 | 3/2010 | Janssen et al. | |
| 7,703,698 B2 | 4/2010 | Janssen et al. | |
| 7,712,353 B2 | 5/2010 | Janssen et al. | |
| 7,735,751 B2 | 6/2010 | Ehlert et al. | |
| 7,780,743 B2 | 8/2010 | Greaves et al. | |
| 7,785,674 B2 | 8/2010 | Janssen et al. | |
| 2001/0040935 A1 | 11/2001 | Case | |
| 2002/0036173 A1 | 3/2002 | Feke et al. | |
| 2002/0164274 A1 | 11/2002 | Haggett et al. | |
| 2003/0042174 A1 | 3/2003 | Austin | |
| 2003/0047067 A1 | 3/2003 | Kraus et al. | |
| 2003/0048692 A1 | 3/2003 | Cohen et al. | |
| 2003/0051989 A1 | 3/2003 | Austin | |
| 2003/0061939 A1 | 4/2003 | Hutton et al. | |
| 2003/0066899 A1 | 4/2003 | Gipson | |
| 2003/0116014 A1 | 6/2003 | Possanza et al. | |
| 2003/0143110 A1 | 7/2003 | Kritzler | |
| 2003/0194692 A1 | 10/2003 | Purdum | |
| 2003/0234173 A1 | 12/2003 | Minter | |
| 2004/0022695 A1 | 2/2004 | Simon et al. | |
| 2004/0065599 A1 | 4/2004 | Lal et al. | |
| 2004/0079580 A1 | 4/2004 | Manna et al. | |
| 2004/0120904 A1 | 6/2004 | Lye et al. | |
| 2004/0142041 A1 | 7/2004 | MacDonald et al. | |
| 2004/0187524 A1 | 9/2004 | Sen et al. | |
| 2004/0202728 A1 | 10/2004 | Shanker et al. | |
| 2005/0000914 A1 | 1/2005 | Dahlberg et al. | |
| 2005/0008560 A1 | 1/2005 | Kataoka et al. | |
| 2005/0017599 A1 | 1/2005 | Puskas | |
| 2005/0025797 A1 | 2/2005 | Wing | |
| 2005/0042129 A1 | 2/2005 | Kazem | |
| 2005/0082234 A1 | 4/2005 | Solenthaler | |
| 2005/0084438 A1 | 4/2005 | Do et al. | |
| 2005/0084464 A1 | 4/2005 | McGrath et al. | |
| 2005/0085144 A1 | 4/2005 | MacDonald et al. | |
| 2005/0092931 A1 * | 5/2005 | Gadgil et al. | 250/434 |
| 2005/0094486 A1 | 5/2005 | Taniguchi | |
| 2005/0129161 A1 | 6/2005 | Laberge | |
| 2005/0207431 A1 | 9/2005 | Beca et al. | |
| 2005/0208303 A1 | 9/2005 | Atarashi et al. | |
| 2005/0220665 A1 | 10/2005 | Ding | |
| 2005/0235740 A1 | 10/2005 | Desie et al. | |
| 2005/0260106 A1 | 11/2005 | Marhasin | |
| 2006/0000034 A1 | 1/2006 | McGrath | |
| 2006/0008442 A1 | 1/2006 | MacDonald et al. | |
| 2006/0120212 A1 | 6/2006 | Taniguchi et al. | |
| 2007/0062801 A1 | 3/2007 | Foret | |
| 2007/0114306 A1 | 5/2007 | Kawakami et al. | |
| 2007/0119785 A1 | 5/2007 | Englehardt et al. | |
| 2007/0131034 A1 | 6/2007 | Ehlert et al. | |
| 2007/0170277 A1 | 7/2007 | Ehlert | |
| 2008/0061000 A1 | 3/2008 | Janssen | |
| 2008/0062811 A1 | 3/2008 | Janssen | |
| 2008/0063718 A1 | 3/2008 | Janssen | |
| 2008/0067418 A1 * | 3/2008 | Ross | 250/455.11 |
| 2008/0069887 A1 | 3/2008 | Baran et al. | |
| 2008/0117711 A1 | 5/2008 | Omasa | |
| 2008/0156737 A1 | 7/2008 | Janssen et al. | |
| 2008/0159063 A1 | 7/2008 | Janssen et al. | |
| 2008/0192568 A1 | 8/2008 | Hielscher et al. | |
| 2008/0251375 A1 | 10/2008 | Hielscher et al. | |
| 2009/0014377 A1 | 1/2009 | Janssen et al. | |
| 2009/0147905 A1 | 6/2009 | Janssen et al. | |
| 2009/0155091 A1 | 6/2009 | Ehlert et al. | |
| 2009/0158936 A1 | 6/2009 | Janssen et al. | |
| 2009/0162258 A1 | 6/2009 | Janssen et al. | |
| 2009/0165654 A1 | 7/2009 | Koenig et al. | |
| 2009/0166177 A1 | 7/2009 | Wenzel et al. | |
| 2009/0168590 A1 | 7/2009 | Koenig et al. | |
| 2009/0168591 A1 | 7/2009 | Wenzel et al. | |
| 2009/0262597 A1 | 10/2009 | Kieffer et al. | |
| 2010/0150859 A1 | 6/2010 | Do et al. | |
| 2010/0206742 A1 | 8/2010 | Janssen et al. | |
| 2010/0296975 A1 | 11/2010 | Peshkovsky et al. | |

FOREIGN PATENT DOCUMENTS

| | | |
|---|---|---|
| CN | 1535249 A | 10/2004 |
| CN | 1247628 | 3/2006 |
| CN | 101153138 | 4/2008 |
| DE | 262553 A3 | 12/1988 |
| DE | 9017338 | 3/1991 |
| DE | 4444525 | 6/1996 |
| DE | 19618217 A1 | 11/1997 |
| DE | 19854013 | 5/2000 |
| DE | 19913397 | 9/2000 |
| DE | 19938254 | 2/2001 |
| DE | 10015144 A1 | 10/2001 |
| DE | 29825063 | 6/2004 |
| DE | 202005009923 U1 | 4/2005 |
| DE | 102004040233 | 3/2006 |
| DE | 102005025118 | 1/2007 |
| DE | 102005034629 | 1/2007 |
| EP | 0269941 A1 | 6/1988 |
| EP | 0292470 | 11/1988 |
| EP | 347891 | 12/1989 |
| EP | 0457187 A2 | 11/1991 |
| EP | 0459967 | 12/1991 |
| EP | 0625482 | 11/1994 |
| EP | 0648531 | 4/1995 |
| EP | 0894612 A2 | 2/1999 |
| EP | 1375432 A1 | 2/2004 |
| EP | 1954388 | 3/2007 |
| EP | 0983968 | 3/2008 |
| EP | 2173669 A2 | 4/2010 |
| EP | 2176173 A2 | 4/2010 |
| FR | 2793811 | 11/2000 |
| FR | 2832703 A1 | 5/2005 |
| GB | 1404575 | 9/1975 |
| JP | 56028221 | 3/1981 |
| JP | 57119853 | 7/1982 |
| JP | 58034051 | 2/1983 |
| JP | 62001413 A | 1/1987 |
| JP | 62039839 U | 3/1987 |
| JP | 6372364 | 4/1988 |
| JP | 63104664 | 5/1988 |
| JP | 1108081 | 4/1989 |
| JP | 2025602 | 1/1990 |
| JP | 02281185 A | 11/1990 |
| JP | 03053195 A | 3/1991 |
| JP | 3086258 | 4/1991 |

(56) References Cited

FOREIGN PATENT DOCUMENTS

| | | | |
|---|---|---|---|
| JP | 03-157129 A | 5/1991 | |
| JP | 6228824 | 8/1994 | |
| JP | 8304388 | 11/1996 | |
| JP | 9286943 | 11/1997 | |
| JP | 10060331 | 3/1998 | |
| JP | 11133661 | 5/1999 | |
| JP | 2000158364 | 12/1999 | |
| JP | 2001017970 | 1/2001 | |
| JP | 2001252588 | 9/2001 | |
| JP | 2003103152 A | 4/2003 | |
| JP | 2004020176 | 1/2004 | |
| JP | 2004256783 | 9/2004 | |
| JP | 2005118688 | 5/2005 | |
| JP | 2000024494 A | 1/2010 | |
| KR | 20020073778 A | 9/2002 | |
| KR | 1020050013858 A | 2/2005 | |
| WO | 9400757 | 1/1994 | |
| WO | 9420833 | 9/1994 | |
| WO | 9429873 A | 12/1994 | |
| WO | 9600318 | 1/1996 | |
| WO | 9609112 A1 | 3/1996 | |
| WO | 9620017 A1 | 7/1996 | |
| WO | 9743026 | 11/1997 | |
| WO | 9817373 | 4/1998 | |
| WO | 9844058 | 10/1998 | |
| WO | 9933520 | 7/1999 | |
| WO | 0004978 | 2/2000 | |
| WO | 0041794 | 7/2000 | |
| WO | 0139200 A | 5/2001 | |
| WO | 0222252 | 3/2002 | |
| WO | 0250511 | 6/2002 | |
| WO | 02080668 A2 | 10/2002 | |
| WO | 03012800 | 2/2003 | |
| WO | 03102737 | 12/2003 | |
| WO | 2004026452 | 4/2004 | |
| WO | 2004064487 | 8/2004 | |
| WO | 2005014489 A1 | 2/2005 | |
| WO | 2006037591 | 4/2006 | |
| WO | 2006043970 A2 | 4/2006 | |
| WO | 2006073645 A1 | 7/2006 | |
| WO | 2006074921 | 7/2006 | |
| WO | 2006093804 | 9/2006 | |
| WO | 2007011520 A2 | 1/2007 | |
| WO | 2005011804 | 5/2007 | |
| WO | 2007060245 A1 | 5/2007 | |
| WO | 2007095871 | 8/2007 | |
| WO | 2008029311 A1 | 3/2008 | |
| WO | 2008029379 | 3/2008 | |
| WO | 2008047259 | 4/2008 | |
| WO | 2008085806 | 7/2008 | |
| WO | 2009007920 A2 | 1/2009 | |

OTHER PUBLICATIONS

Non-final Office action regarding U.S. Appl. No. 11/963,237, dated Jul. 8, 2010.
U.S. Appl. No. 11/777,145, filed Jul. 12, 2007.
U.S. Appl. No. 11/777,151, filed Jul. 12, 2007.
U.S. Appl. No. 11/777,140, filed Jul. 12, 2007.
U.S. Appl. No. 11/963,237, filed Dec. 21, 2007.
European Office Action regarding European Application No. 07805228.9, dated Oct. 9, 2009.
Non-final Office Action regarding U.S. Appl. No. 12/335,231, dated Oct. 15, 2009.
Non-final office action regarding U.S. Appl. No. 11/950,943, dated May 1, 2009.
J.D. Lawson, "Some Criteria for a Power Producing Thermonuclear Reactor", Proc. Phys. Soc. B70, pp. 6-10 (1957).
L.A. Artsimovich, "Controlled Thermonuclear Reactions", Gordon and Breach Science Publishers, New York, first English translation, 1964.
D.R.O. Morrison, "Cold Fusion Update No. 9", Jan. 1994, from Newsgroups sci.physics.fusion, http://www.groups.google.com.
Brenner et al, Single-bubble sonoluminescence, Reviews of Modern Physics, vol. 74, Apr. 2002, pp. 425-484.
J. Lister, Plasma Physics and Controlled Fusion 48, pp. 715-716 (2006).
U.S. Department of Energy, "Report of the Review of Low Energy Nuclear Reactions", Dec. 1, 2004 (USDOE).
International Search Report and Written Opinion regarding PCT/IB2008/055395, dated Sep. 14, 2009.
International Search Report and Written Opinion regarding PCT/IB2008/055514, dated Aug. 25, 2009.
Non-final office action regarding U.S. Appl. No. 11/530,311, dated Nov. 5, 2008.
International Search Report and Written Opinion issued Aug. 18, 2009 for PCT/IB2008/055520.
International Search Report and Written Opinion issued Aug. 18, 2009 for PCT/IB2008/055517.
International Search Report and Written Opinion issued Aug. 18, 2009 for PCT/IB2008/055518.
International Search Report and Written Opinion regarding PCT/IB2007/054892 dated May 15, 2008.
Non-final office action regarding U.S. Appl. No. 11/617,497, dated Jun. 26, 2009.
Non-final Office action issued in related U.S. Appl. No. 11/777,140 on Aug. 9, 2010.
Non-Final Office action issued in related U.S. Appl. No. 11/966,418 on Aug. 2, 2010.
Non-Final Office action issued in related U.S. Appl. No. 11/966,447 on Aug. 2, 2010.
Final Office Action Regarding U.S. Appl. No. 11/530,311, dated Jun. 23, 2009.
Non-final Office Action submitted in U.S. Appl. No. 12/704,058 dated Dec. 9, 2010.
Non-final Office Action submitted in U.S. Appl. No. 11/530,183 dated Oct. 13, 2010.
International Search Report and Written Opinion regarding PCT/IB2008/055396, dated Jul. 29, 2009.
International Search Report and Written Opinion regarding PCT/IB2008/052760, dated Feb. 17, 2009.
International Search Report and Written Opinion regarding PCT/IB2007/052947, dated Mar. 12, 2008.
International Search Report and Written Opinion regarding PCT/IB2007/052945, dated Feb. 1, 2008.
International Search Report and Written Opinion regarding PCT/IB2007/052988, dated Feb. 14, 2008.
Taleyarkhan, et al., "Evidence for Nuclear Emissions During Acoustic Cavitation," Science, (Mar. 8, 2002), vol. 295, pp. 1868-1873.
Tal-Figiel B., The Formation of Stable W/O, O/W, W/O/W Cosmetic Emulsions in an Ultrasonic Field, viewed at http://www.atypon-link.com/ICHEME/doi/abs/10.1205/cherd06199 on Oct. 19, 2007.
"Controlled Thermonuclear Fusion" viewed at http://library.thinkquest.org/17940/texts/fusion_controlled/fusion_controlled.html on Oct. 23, 2007.
Flannigan, "Measurement of Pressure and Density Inside a Single Sonoluminescing Bubble," Physical Review Letters (May 26, 2006), PRL 96.
Taleyarkhan, et al. "Additional Evidence of Nuclear Emissions During Acoustic Cavitation," Physical Review E, (Mar. 2004). vol. 69.
"Thermonuclear Fusion Energy Source for Future Generations," viewed at http://nature.com/news/2006/060109/full/060109-5.html on May 4, 2007.
Lahey, Taleyarkhan, and Nigmatulin, "Bubble Power, "IEEE spectrum, May 2005, pp. 39-43.
International Search Report and Written Opinion regarding PCT/IB2007/053621, dated Feb. 14, 2008.
International Search Report and Written Opinion regarding PCT/IB2007/053623, dated Feb. 14, 2008.
International Search Report and Written Opinion regarding PCT/IB2007/053622, dated Feb. 14, 2008.
U.S. Appl. No. 11/617,497, filed Dec. 28, 2006.
U.S. Appl. No. 11/617,515, filed Dec. 28, 2006.
U.S. Appl. No. 11/950,943, filed Dec. 5, 2007.
U.S. Appl. No. 11/966,458, filed Dec. 28, 2007.
U.S. Appl. No. 11/966,472, filed Dec. 28, 2007.

(56) References Cited

OTHER PUBLICATIONS

U.S. Appl. No. 11/966,418, filed Dec. 28, 2007.
U.S. Appl. No. 11/966,447, filed Dec. 28, 2007.
U.S. Appl. No. 11/777,145, filed Dec. 12, 2007.
U.S. Appl. No. 11/965,435, filed Dec. 27, 2007.
Final Office action issued in U.S. Appl. No. 11/966,447 mailed Jan. 5, 2011.
Supplementary European Search Report issued in EP Application No. 08789242 mailed Dec. 17, 2010.
Non-final office action regarding U.S. Appl. No. 11/617,515, dated Mar. 27, 2009.
Non-final Office action regarding U.S. Appl. No. 11/965,435, dated Mar. 11, 2010.
English translation of Nagel WO 2006/074921 A1, accessed on the EPO website.
Non-final Office action regarding U.S. Appl. No. 11/530,183, dated Apr. 19, 2010.
International Search Report and Written Opinion regarding PCT/IB2008/055394, dated Sep. 28, 2009.
Blume, T. and Neis, U. "Improved wastewater disinfection by ultrasonic pre-treatment," Ultrasonics Sonochemistry, 2004, No. 11, pp. 333-336.
Oct. 27, 2010 Letter regarding the Office action issued for Mexican Patent Application Serial No. MX/a/2009/002519 mailed Oct. 12, 2010.
International Search Report and Written Opinion for PCT/IB2008/052764 mailed Apr. 2, 2009.
Takehi Moriguchi, et al. "Metal-modified silica adsorbents for removal of humic substances in water." Journal of Colloid and Interface Science 283, 2005 300-310, See Abstract, pp. 301 and 304.
International Search Report and Written Opinion regarding PCT/IB2009/055090, dated Jul. 16, 2010.
International Search Report and Written Opinion regarding PCT/IB2009/055092, dated Jul. 16, 2010.
International Search Report and Written Opinion from PCT/IB2008/052766, dated Mar. 31, 2009.
Kuo et al., "Nano-particles dispersion effect on Ni/Al2O3 Composite Coatings," Materials Chemistry and Physics, 86: 5-10 (2004).
Sivakumar et al., "Preparation of nanosized TiO2 supported on activated alumina by a sonochemical method: observation of an increased photocatalytic decolourisation efficiency," Research on Chemical Intermediates, 30(7-8): 785-792 (2004).
Non-final Office action issued in related U.S. Appl. No. 11/530,210 on Jun. 28, 2010.
Non-final Office action issued in related U.S. Appl. No. 11/530,210 on Dec. 1, 2010.
Final Office action issued in related U.S. Appl. No. 11/777,140 Dec. 1, 2010.
International Search Report and Written Opinion regarding PCT/IB2007/054898, dated May 15, 2008.
Non-final Office Action issued in U.S. Appl. No. 11/777,151 mailed Dec. 8, 2010.
Final Office Action issued in U.S. Appl. No. 11/966,418 mailed Jan. 12, 2011.
Non-final Office action issued in U.S. Appl. No. 11/777,140, dated Feb. 23, 2011.
Final Office Action issued in U.S. Appl. No. 11/966,458, dated Mar. 17, 2011.
Final Office Action issued in U.S. Appl. No. 11/530,183, dated Mar. 22, 2011.
Non-Final Office Action issued in U.S. Appl. No. 11/966,472, dated Mar. 31, 2011.
Final Office Action issued in U.S. Appl. No. 12/335,231, dated Mar. 31, 2011.
Barbaglia et al., "Search of Fusion Reactions During the Cavitation of a Single Bubble in Deuterated Liquids," Physica Scripta 72, pp. 75-78 (2005).
First Office Action for China Patent Application No. 200880016947.3, dated Jun. 24, 2011.
Final Office Action for U.S. Appl. No. 11/530,210, mailed Jul. 1, 2011.
Non-Final Office Action issued for U.S. Appl. No. 12/335,231, mailed Jul. 13, 2011.
Non-Final Office Action issued for U.S. Appl. No. 12/335,176, mailed Jul. 13, 2011.
Chinese First Office Action for Patent Application No. 200880123172.0 dated Oct. 10, 2012; 9 pages.
Chinese First Office Action for Patent Application No. 200880123165.0 dated Oct. 10, 2012; 9 pages.
Extended European Search Report received in EP Patent Application No. 08789248.5 dated Nov. 30, 2011.
Chinese First Office Action for Patent Application No. 200880123174.X dated Sep. 20, 2012; 8 pages.
EP Office Action for Patent Application No. 08 789 248.5-2104 dated Sep. 4, 2012; 4 pages.
First Office Action for China Patent Application No. 200780033331.3, dated Nov. 14, 2011.
Chinese Office Action for Patent Application No. 200880123174.X dated Mar. 27, 2013; 5 pages.
Extended European Search Report received in EP Patent Application No. 08868425 dated Feb. 23, 2012.
First Office Action for China Patent Application No. 200880121407.2, dated Aug. 24, 2011.
EP Office Action for Patent Application No. 08 789 246.9-2104 dated Sep. 4, 2012; 4 pages.
Non-final Office Action received in U.S. Appl. No. 12/438,317, mailed Sep. 24, 2012.
Extended European Search Report for EP Patent Application No. 08867871.9, mailed Sep. 27, 2012.
Non-final Office action issued for U.S. Appl. No. 12/335,176 (Jun. 6, 2013).
Extended European Search Report regarding European Application No. 08867345.4, dated Jul. 24, 2013; 8 pages.
Extended European Search Report regarding European Application No. 13159386.5, dated May 3, 2013; 8 pages.
Non-Final Office Action for U.S. Appl. No. 11/530,210 dated Jul. 17, 2013; 14 pages.
European Extended Search Report received in EP Application No. 08868912.0, mailed Jan. 2, 2014.
European Search Report regarding European Application No. 08789248.5, dated May 2, 2013; 3 pages.
International Search Report and Written Opinion, PCT/IB2008/055051 (Feb. 20, 2009).
Peplow, Mark, "Desktop fusion is back on the table," viewed at http//nature.com/news/2006/060109/full/060109-5.html on May 4, 2007.

* cited by examiner

## LIQUID TREATMENT SYSTEM

FIELD

The present disclosure relates generally to systems for treating a liquid, and more particularly to systems for treating a liquid using ultrasonic energy and ultraviolet (UV) light.

BACKGROUND

It is common for various liquids to be treated to remove impurities from the liquids. For example, wastewater is often treated to comply with government laws before it is released into the environment or a municipal wastewater system; potable water is often treated to make it suitable for consumption; swimming pool water is often treated to ensure that it is safe for swimming; and process water is often treated to minimize damage to mechanical components that can be caused by the buildup of impurities on the components. The types of impurities that may be in these various liquids include, without limitations, suspended solids, organic matter, microorganisms, dissolved mineral matter, and the like.

There are many known treatment technologies for treating liquids to remove or eliminate impurities within the liquid, for example, oxidation with hydrogen peroxide and/or ozone, irradiating with ultraviolet light. Other, known treatment technologies may alter the chemical composition of impurities. Many of these known technologies are costly to purchase, operate, and maintain. In addition, they are often time consuming and relatively inefficient, and/or ineffective in their treatment of the impurities within the liquid.

SUMMARY

In one aspect, a liquid treatment system generally comprises a housing defining an interior space. The housing has at least one inlet port for receiving liquid into the interior space of the housing and at least one outlet port for allowing liquid to exit the interior space of the housing. The outlet port is spaced from the inlet port so that liquid flows through the interior space of the housing from the inlet port to the outlet port. An ultrasonic waveguide assembly is disposed within the interior space of the housing and comprises an ultrasonic horn disposed at least in part intermediate the inlet port and the outlet port of the housing. The ultrasonic horn is operable at an ultrasonic frequency to ultrasonically energize liquid flowing from the inlet port to the outlet port within the housing. An ultraviolet light source is provided for emitting ultraviolet light into the interior space of the housing to treat liquid flowing from the inlet port to the outlet port.

In another aspect, a liquid treatment system generally comprises an ultrasonic waveguide assembly having an ultrasonic horn operable at an ultrasonic frequency to ultrasonically energize liquid, and an ultraviolet light source for emitting ultraviolet light onto the liquid while the liquid is ultrasonically energized by the ultrasonic horn.

BRIEF DESCRIPTION OF THE DRAWINGS

Corresponding reference characters indicate corresponding parts throughout the drawings.

DETAILED DESCRIPTION OF THE INVENTION

Figure 1:
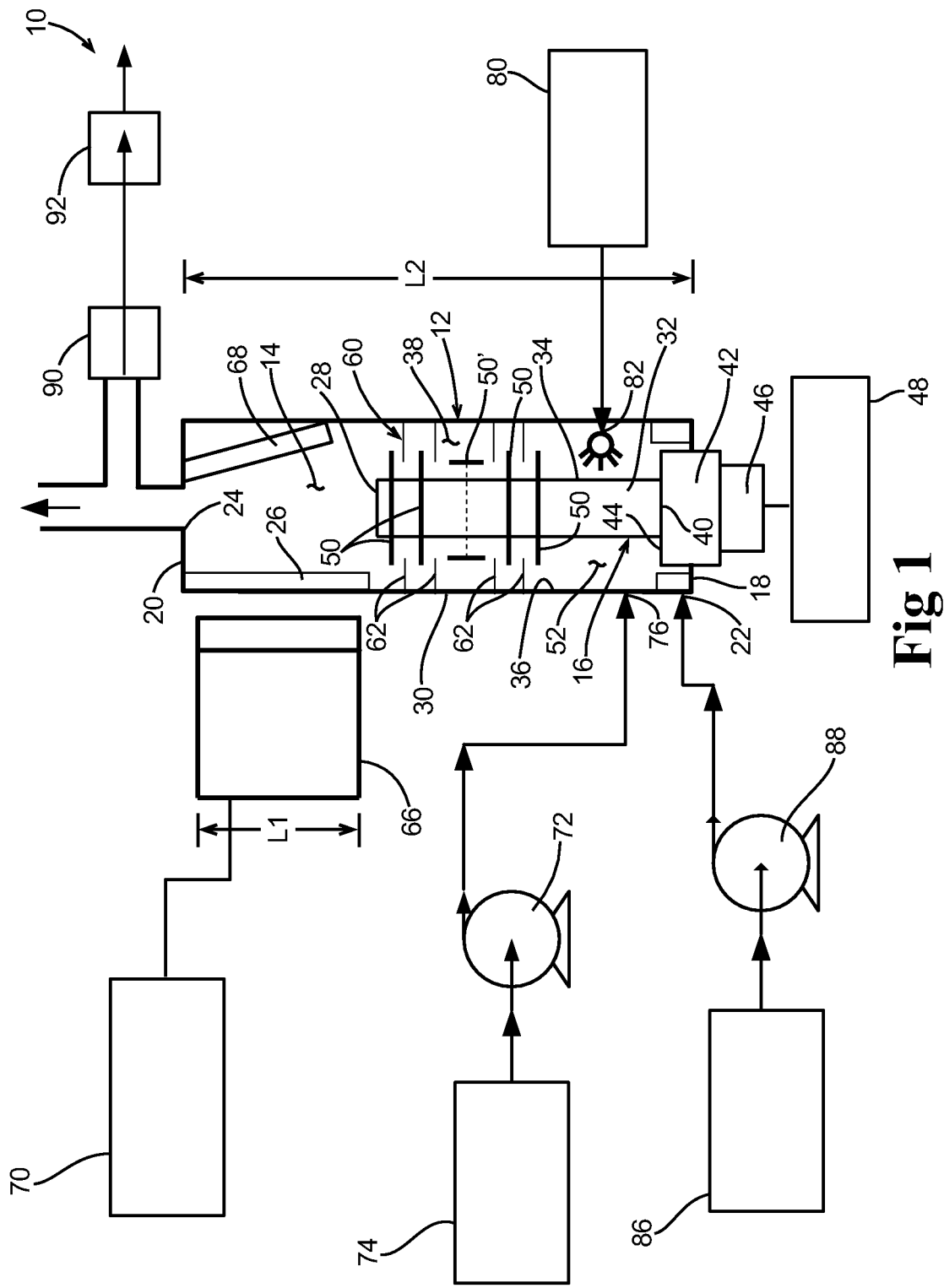
FIG. 1 is a schematic of one embodiment of a liquid treatment system for ultrasonically energizing a liquid and emitting ultraviolet light to the energized liquid.

With particular reference now to FIG. 1, in one embodiment a liquid treatment system, indicated generally at 10, for treating a flowing liquid is operable to ultrasonically energize a liquid and emit ultraviolet light to the energized liquid as the liquid flows through the system. The term "liquid", as used herein, is intended to refer to a single component liquid, a solution comprised of two or more components in which at least one of the components is a liquid such as a liquid-liquid mixture, a liquid-gas mixture or a liquid in which particulate matter is entrained, or other viscous fluids. In one suitable embodiment, the liquid treated by the treatment system 10 may be an industrial wastewater having one or more impurities. It is understood, however, that the liquid treatment system 10 can be used to treat other types of liquids including other types of water, such as, potable water, swimming pool water, and process water. The liquid treatment system 10 disclosed herein may be used by itself or may be a component of a larger liquid treatment process.

In one suitable embodiment, as illustrated in FIG. 1, the liquid treatment system 10 comprises an ultrasonic treatment housing (or chamber), indicated generally at 12, defining an interior space 14 for receiving at least a portion of a waveguide assembly, indicated generally at 16. The housing 12 is generally elongate and has an inlet end 18 (a lower end in the orientation of the illustrated embodiment) and an outlet end 20 (an upper end in the orientation of the illustrated embodiment). The housing 12 is configured such that wastewater (broadly, a liquid to be treated) enters the interior space 14 of the housing at the inlet end 18 thereof, flows generally longitudinally within the housing (e.g., upward in the orientation of illustrated embodiment) and exits the housing generally at the outlet end 20 of the housing. More particularly, the housing 12 has one or more inlet ports 22 (one such inlet port being illustrated in FIG. 1) formed therein through which wastewater to be treated within the housing is delivered to the interior space 14 thereof. It will be understood by one skilled in the art that the inlet end 18 of the housing 12 may include more than one inlet port 22 and remain within the scope of this invention. For example, although not shown, the housing 12 may comprise two inlet ports, wherein the first inlet port and the second inlet port are suitably in parallel, spaced relationship with each other. The housing 12 also has at least one outlet port 24 at the outlet end 20 thereof for allowing wastewater to exit the interior space 14 of the housing. Thus, wastewater flows into the interior space 14 of the housing 12 through the inlet port 22, flows through the interior space, and exists through the outlet port 24.

In the illustrated embodiment, the housing 12 is generally cylindrical, thereby having a generally annular cross-section. However, it is contemplated that the cross-section of the housing 12 may be other than annular, such as polygonal or another suitable shape, and remain within the scope of this disclosure. As described below, at least a portion 26 of the housing 12 is suitably constructed of a transparent material. In the illustrated embodiment, the portion 26 of the housing 12 is constructed of quartz glass while the remainder of the housing is constructed of stainless steel. It is understood, however, that the housing 12 may be constructed from any suitable material as long as the material is compatible with the wastewater being treated in the housing, the pressure at which the housing is intended to be subjected to during operation, and other system conditions such as temperature.

With reference still to FIG. 1, the waveguide assembly 16 extends longitudinally at least in part within the interior space 14 of the housing 12 to ultrasonically energize the wastewater (and any other components of the wastewater, e.g., impurities) flowing through the interior space of the housing. In particular, the waveguide assembly 16 of the illustrated embodiment extends longitudinally from the inlet end 18 of the housing 12 up into the interior space 14 thereof to a terminal end 28 of the waveguide assembly, which is disposed intermediate the inlet port 22 and the outlet port 24. Although illustrated in FIG. 1 as extending longitudinally into the interior space 14 of the housing 12, it is understood that the waveguide assembly 16 may extend laterally from a sidewall 30 of the housing, running horizontally through the interior space thereof. Typically, the waveguide assembly 16 is mounted, either directly or indirectly, to the housing 12 as will be described later herein.

The waveguide assembly 16 suitably comprises an elongate ultrasonic horn 32 disposed within the interior space 14 of the housing 12 intermediate the inlet port 22 and the outlet port 24 for complete submersion within the wastewater being treated in the housing, and more suitably, in the illustrated embodiment, it is aligned coaxially with the housing. The ultrasonic horn 32 has an outer surface 34 that together with an inner surface 36 of the sidewall 30 of the housing 12 defines a flow path 38 within the interior space 14 of the housing along which wastewater and other components flow past the ultrasonic horn within the housing (this portion of the flow path being broadly referred to herein as the ultrasonic treatment zone).

The ultrasonic horn 32 has an upper end defining the terminal end 28 of the waveguide assembly 16 and a longitudinally opposite lower end 40. It is particularly suitable that the waveguide assembly 16 also comprises a booster 42 coaxially aligned with and connected at an upper end 44 thereof to the lower end 40 of the ultrasonic horn 32. It is understood, however, that the waveguide assembly 16 may comprise only the ultrasonic horn 32 and remain within the scope of this disclosure. It is also contemplated that the booster 42 may be disposed entirely exterior of the housing 12, with the ultrasonic horn 32 mounted on the housing without departing from the scope of this disclosure.

The waveguide assembly 16, and more particularly the booster 42, is suitably mounted on the housing 12 at the inlet end 18 thereof by a mounting member (not shown) that is configured to vibrationally isolate the waveguide assembly (which vibrates ultrasonically during operation thereof) from the housing. That is, the mounting member inhibits the transfer of longitudinal and transverse mechanical vibration of the waveguide assembly 16 to the housing 12 while maintaining the desired transverse position of the waveguide assembly (and in particular the ultrasonic horn 32) within the interior space 14 of the housing and allowing both longitudinal and transverse displacement of the ultrasonic horn 32 within the housing. The mounting member also at least in part (e.g., along with the booster 42 and/or lower end 40 of the ultrasonic horn 32) closes the inlet end 18 of the housing 12. Examples of suitable mounting member configurations are illustrated and described in U.S. Pat. No. 6,676,003, the entire disclosure of which is incorporated herein by reference to the extent it is consistent herewith.

In one suitable embodiment, the mounting member is of single-piece construction. Even more suitably, the mounting member may be formed integrally with the booster 42 (and more broadly with the waveguide assembly 16). However, it is understood that the mounting member may be constructed separately from the waveguide assembly 16 and remain within the scope of this disclosure. It is also understood that one or more components of the mounting member may be separately constructed and suitably connected or otherwise assembled together.

The mounting member may be further constructed to be generally rigid (e.g., resistant to static displacement under load) so as to hold the waveguide assembly 16 in proper alignment within the interior space 14 of the housing 12. For example, the rigid mounting member in one embodiment may be constructed of a non-elastomeric material, more suitably metal, and even more suitably the same metal from which the booster (and more broadly the waveguide assembly 16) is constructed. The term "rigid" is not, however, intended to mean that the mounting member is incapable of dynamic flexing and/or bending in response to ultrasonic vibration of the waveguide assembly 16. In other embodiments, the rigid mounting member may be constructed of an elastomeric material that is sufficiently resistant to static displacement under load but is otherwise capable of dynamic flexing and/or bending in response to ultrasonic vibration of the waveguide assembly 16.

A suitable ultrasonic drive system includes at least an exciter 46 and a power source 48 disposed exterior of the housing 12 and operatively connected to the booster 42 to energize the waveguide assembly 16 to mechanically vibrate ultrasonically. In one embodiment, the drive system is capable of operating the waveguide assembly 16 at a frequency in the range of about 15 kHz to about 100 kHz, more suitably in the range of about 15 kHz to about 60 kHz, and even more suitably in the range of about 20 kHz to about 40 kHz. Such ultrasonic drive systems are well known to those skilled in the art and need not be further described herein. Examples of suitable ultrasonic drive systems include a Model 20A3000 system available from Dukane Ultrasonics of St. Charles, Ill., and a Model 2000CS system available from Herrmann Ultrasonics of Schaumberg, Ill.

With particular reference to FIG. 1, the ultrasonic horn 32 has two or more (i.e., a plurality of) agitating members 50, 50' connected to the ultrasonic horn 32 and extending at least in part transversely outward from the outer surface 34 of the ultrasonic horn in longitudinally spaced relationship with each other. Five such agitating members 50, 50' can be seen in FIG. 1. The ultrasonic horn 32 is suitably sized to have a length equal to about one-half of the resonating wavelength (otherwise commonly referred to as one-half wavelength) of the ultrasonic horn. It is understood, however, that the ultrasonic horn 32 may be sized to have any increment of one-half wavelength without departing from the scope of this disclosure.

In the illustrated embodiment, four of the five agitating members 50 comprise a series of four washer-shaped rings that extend continuously about the circumference of the ultrasonic horn 32 in longitudinally spaced relationship with each other and transversely (e.g., radially in the illustrated embodiment) outward from the outer surface 34 of the ultrasonic horn. In this manner, the vibrational displacement of each of the agitating members 50 relative to the ultrasonic horn 32 is relatively uniform about the circumference of the ultrasonic horn. It is understood, however, that the agitating members 50 need not each be continuous about the circumference of the ultrasonic horn 32. For example, the agitating members 50 may instead be in the form of spokes, blades, fins or other discrete structural members that extend transversely outward from the outer surface 34 of the ultrasonic horn 32.

As illustrated in FIG. 1, the other one of the agitating members 50' (i.e., the central agitating member) has a T-shape. Specifically, the agitating member 50' disposed at a nodal region of the ultrasonic horn 32, as described more fully below, has a T-shape. It has been found that agitating members 50' having a T-shape, generate a strong radial (e.g., horizontal) acoustic wave that further increases the cavitation effect as described more fully herein.

It is understood that the number of agitating members 50, 50' (e.g., the four rings and one t-shaped member in the illustrated embodiment) may be less than or more than five without departing from the scope of this disclosure. It is also understood that the longitudinal spacing between the agitating members 50, 50' may be other than as illustrated in FIG. 1 and described above (e.g., either closer or spaced further apart). Furthermore, while the agitating members 50, 50' illustrated in FIG. 1 are equally longitudinally spaced from each other, it is alternatively contemplated that where more than two agitating members are present the spacing between longitudinally consecutive agitating members need not be uniform to remain within the scope of this disclosure.

The locations of the agitating members 50, 50' along the length of the ultrasonic horn 32 are at least in part a function of the intended vibratory displacement of the agitating members upon vibration of the ultrasonic horn. For example, in the illustrated embodiment of FIG. 1, the ultrasonic horn 32 has a nodal region located generally longitudinally centrally of the ultrasonic horn. As used herein, the "nodal region" of the ultrasonic horn 32 refers to a longitudinal region or segment of the ultrasonic horn along which little (or no) longitudinal displacement occurs during ultrasonic vibration of the ultrasonic horn and transverse (e.g., radial in the illustrated embodiment) displacement of the ultrasonic horn is generally maximized. Transverse displacement of the ultrasonic horn 32 suitably comprises transverse expansion of the ultrasonic horn but may also include transverse movement (e.g., bending) of the ultrasonic horn.

In the illustrated embodiment of FIG. 1, the configuration of the one-half wavelength ultrasonic horn 32 is such that the nodal region is particularly defined by a nodal plane (i.e., a plane transverse to the ultrasonic horn at which no longitudinal displacement occurs while transverse displacement is generally maximized) is present. This plane is also sometimes referred to as a "nodal point". Accordingly, agitating members 50 (e.g., in the illustrated embodiment, the rings) that are disposed longitudinally further from the nodal region of the ultrasonic horn 32 will experience primarily longitudinal displacement while the agitating member 50' that are longitudinally nearer to or at the nodal region (e.g., the T-shaped agitating member) will experience an increased amount of transverse displacement and a decreased amount of longitudinal displacement relative to the longitudinally distal agitating members. It is understood that the ultrasonic horn 32 may be configured so that the nodal region is other than centrally located longitudinally on the ultrasonic horn member without departing from the scope of this disclosure. It is also understood that one or more of the agitating members 50, 50' may be longitudinally located on the ultrasonic horn so as to experience both longitudinal and transverse displacement relative to the ultrasonic horn 32 upon ultrasonic vibration of the ultrasonic horn.

The agitating members 50, 50' are sufficiently constructed (e.g., in material and/or dimension such as thickness and transverse length, which is the distance that the agitating member extends transversely outward from the outer surface 34 of the ultrasonic horn 32) to facilitate dynamic motion, and in particular dynamic flexing/bending of the agitating members in response to the ultrasonic vibration of the ultrasonic horn. In one particularly suitable embodiment, for a given ultrasonic frequency at which the waveguide assembly 16 is to be operated in the housing (otherwise referred to herein as the predetermined frequency of the waveguide assembly) and a particular wastewater to be treated within the housing 12, the agitating members 50, 50' and ultrasonic horn 32 are suitably constructed and arranged to operate the agitating members in what is referred to herein as an ultrasonic cavitation mode at the predetermined frequency.

As used herein, the ultrasonic cavitation mode of the agitating members 50, 50' refers to the vibrational displacement of the agitating members sufficient to result in cavitation of the liquid being treated at the predetermined ultrasonic frequency. For example, where the liquid flowing within the housing 12 comprises water, and the ultrasonic frequency at which the waveguide assembly 16 is to be operated (i.e., the predetermined frequency) is about 20 kHZ, one or more of the agitating members 50, 50' are suitably constructed to provide a vibrational displacement of at least 1.75 mils (i.e., 0.00175 inches, or 0.044 mm) to establish a cavitation mode of the agitating members. It is understood that the waveguide assembly 16 may be configured differently (e.g., in material, size, etc.) to achieve a desired cavitation mode associated with the particular liquid being treated. For example, as the viscosity of the liquid being treated changes, the cavitation mode of the agitating members may need to be changed.

Ultrasonic cavitation refers to the formation, growth and implosive collapse of bubbles in liquid due to ultrasonic energization thereof. Such cavitation results from pre-existing weak points in the liquid, such as gas-filled crevices in suspended particulate matter or transient microbubbles from prior cavitation events. As ultrasound passes through a liquid, the expansion cycles exert negative pressure on the liquid, pulling the molecules away from one another. Where the ultrasonic energy is sufficiently intense, the expansion cycle creates cavities in the liquid when the negative pressure exceeds the local tensile strength of the liquid, which varies according to the type and purity of liquid.

Small gas bubbles formed by the initial cavities grow upon further absorption of the ultrasonic energy. Under the proper conditions, these bubbles undergo a violent collapse, generating very high pressures and temperatures. In some fields, such as what is known as sonochemistry, chemical reactions take advantage of these high pressures and temperatures brought on by cavitation. In addition, the growth and violent collapse of the bubbles themselves provides a desirably rigorous agitation of the wastewater.

In particularly suitable embodiments, the cavitation mode of the agitating members 50, 50' corresponds to a resonant mode of the agitating members whereby vibrational displacement of the agitating members is amplified relative to the displacement of the ultrasonic horn 32. However, it is understood that cavitation may occur without the agitating members 50, 50' operating in their resonant mode, or even at a vibrational displacement that is greater than the displacement of the ultrasonic horn 32, without departing from the scope of this disclosure.

In general, the ultrasonic horn 32 may be constructed of a metal having suitable acoustical and mechanical properties. Examples of suitable metals for construction of the ultrasonic horn 32 include, without limitation, aluminum, monel, titanium, stainless steel, and some alloy steels. It is also contemplated that all or part of the ultrasonic horn 32 may be coated with another metal such as silver, platinum, gold, palladium, lead dioxide, and copper to mention a few. In one particularly suitable embodiment, the agitating members 50, 50' are constructed of the same material as the ultrasonic horn 32, and are more suitably formed integrally with the ultrasonic horn. In other embodiments, one or more of the agitating members 50, 50' may instead be formed separate from the ultrasonic horn 32 and connected thereto.

While the agitating members 50, 50' (e.g., the rings) illustrated in FIG. 1 are relatively flat, i.e., relatively rectangular in cross-section, it is understood that the rings may have a cross-section that is other than rectangular without departing from the scope of this disclosure. The term "cross-section" is used in this instance to refer to a cross-section taken along one transverse direction (e.g., radially in the illustrated embodiment) relative to the ultrasonic horn's outer surface 34. Additionally, although the agitating members 50 (e.g., the rings) illustrated in FIG. 1 are constructed only to have a transverse component, it is contemplated that one or more of the agitating members 50' may have at least one longitudinal (e.g., axial) component to take advantage of transverse vibrational displacement of the ultrasonic horn 32 (e.g., at and near the nodal region of the ultrasonic horn illustrated in FIG. 1) during ultrasonic vibration of the waveguide assembly 16 (e.g., the T-shaped agitating member).

The interior space 14 of the housing has a liquid intake zone 52 in which initial swirling of wastewater within the interior space 14 of the housing 12 occurs upstream of the agitating members 50, 50' of the ultrasonic horn 32. This intake zone 52 is particularly useful where the housing 12 is used for mixing two or more components together (e.g., the wastewater, hydrogen peroxide, and/or ozone in the illustrated embodiment) whereby initial mixing is facilitated by the swirling action in the intake zone 52 as the components to be mixed enter the housing 12. Additionally, when treating impurities in the wastewater, it may be desirable to add one or more ingredients (e.g., hydrogen peroxide, ozone) that can be premixed with the wastewater being treated before the wastewater comes into contact with the agitating members 50, 50' of the ultrasonic horn 32. In one suitable use, for example, the additional ingredient(s) can be used as an oxidizing agent to allow for better removal of the impurities from the wastewater as described in more detail below.

A baffle assembly, generally indicated at 60, is suitably disposed within the interior space 14 of the housing 12, and in particular generally transversely adjacent the inner surface 36 of the sidewall 30 of the housing and in generally transversely opposed relationship with the ultrasonic horn 32. In one suitable embodiment, the baffle assembly 60 comprises one or more baffle members 62 extending at least in part transversely inward from the inner surface 36 of the sidewall 30 of the housing 12 toward the ultrasonic horn 32. More suitably, the one or more baffle members 62 extend transversely inward from the housing's inner surface 36 to a position longitudinally intersticed with the agitating members 50, 50' that extend outward from the outer surface 34 of the ultrasonic horn 32. The term "longitudinally intersticed" is used herein to mean that a longitudinal line drawn parallel to the longitudinal axis of the ultrasonic horn 32 passes through both the agitating members 50, 50' and the baffle members 62. As one example, in the illustrated embodiment the baffle assembly 60 comprises four, generally annular baffle members 62 (i.e., extending continuously about the ultrasonic horn 32) longitudinally intersticed with the five agitating members 50, 50'.

It will be appreciated that the baffle members 62 thus extend into the flow path 38 of wastewater that flows within the interior space 14 of the housing 12 past the ultrasonic horn 32 (e.g., within an ultrasonic treatment zone). As such, the baffle members 62 inhibit wastewater against flowing along the inner surface 36 of the housing's sidewall 30 past the ultrasonic horn 32, and more suitably the baffle members facilitate the flow of wastewater transversely inward toward the ultrasonic horn for flowing over the agitating members 50, 50' of the ultrasonic horn to thereby facilitate ultrasonic energization (i.e., agitation) of the wastewater.

It is contemplated that the baffle members 62 need not be annular or otherwise extend continuously about the ultrasonic horn. For example, the baffle members 62 may extend discontinuously about the ultrasonic horn 32, such as in the form of spokes, bumps, segments or other discrete structural formations that extend transversely inward from adjacent the inner surface 36 of the sidewall 30 of the housing 12. The term "continuously" in reference to the baffle members 62 extending continuously about the ultrasonic horn 32 does not exclude a baffle members as being two or more arcuate segments arranged in end-to-end abutting relationship, i.e., as long as no significant gap is formed between such segments. Suitable baffle member configurations are disclosed in U.S. application Ser. No. 11/530,311 (filed Sep. 8, 2006), which is hereby incorporated by reference to the extent it is consistent herewith.

Figure 2:
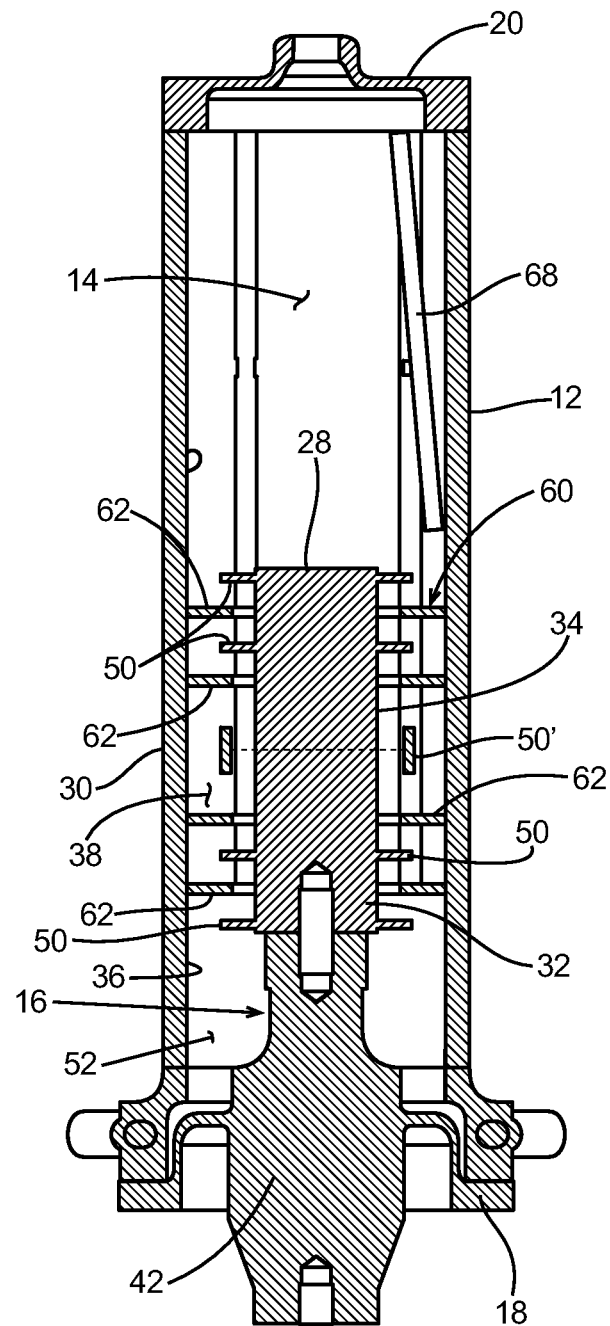
FIG. 2 is a longitudinal (e.g., vertical) cross-section of a housing of the system of FIG. 1 and illustrating an ultrasonic horn and a baffle assembly therein.
Figure 3:
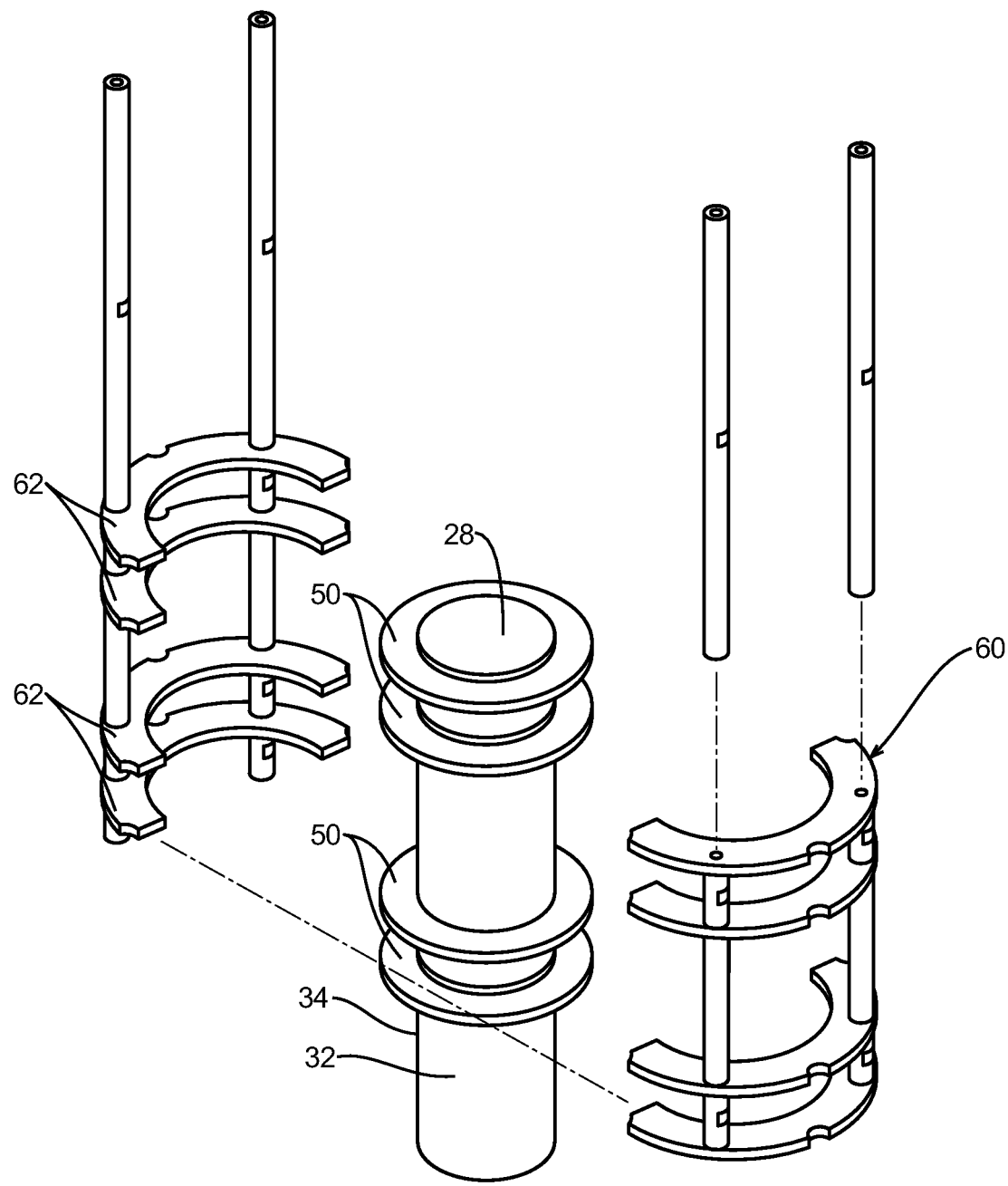
FIG. 3 is an exploded perspective of the ultrasonic horn and the baffle assembly of FIG. 2.

While the baffle members 62 illustrated in FIGS. 1-3 are each generally flat, e.g., having a generally thin rectangular cross-section, it is contemplated that one or more of the baffle members may each be other than generally flat or rectangular in cross-section to further facilitate the flow of gas bubbles within the interior space 14 of the housing 12. The term "cross-section" is used in this instance to refer to a cross-section taken along one transverse direction (e.g., radially in the illustrated embodiment, relative to the ultrasonic horn's outer surface 34).

As illustrated in FIG. 1, the liquid treatment system 10 further comprises an ultraviolet light source 66 for emitting ultraviolet light to irradiate the wastewater (i.e., the liquid) received in the interior space 14 of the housing 12 as it flows from the inlet port 22 to the outlet port 24. In one suitable embodiment, the ultraviolet light source 66 is positioned for emitting ultraviolet light substantially throughout the entire interior space 14 of the housing 12. For example, the ultraviolet light source 66 may have a length L1 that is substantially equal to the length L2 of the housing 12 and is positioned for emitting ultraviolet light into the interior space 14 along the length of the housing. In another configuration and as illustrated in FIG. 1, one or more reflectors 68 may be disposed relative to the interior space 14 of the housing 12 to deflect ultraviolet light emitted by the ultraviolet light source 66 throughout the length of the interior space of the housing. In this configuration, the length L1 of the ultraviolet light source 66 can be substantially less than the length L2 of the housing 12.

As seen in FIG. 1, the ultraviolet light source 66 is suitably disposed exterior of the housing 12 and is positioned adjacent the transparent portion 26 thereof (i.e., the portion of the housing constructed of quartz glass). The transparent portion 26 of the housing 12 is thus sized and shaped for allowing substantially all of the ultraviolet light emitted by the ultraviolet light source 66 into the interior space 14 of the housing 12. It is understood that the transparent portion 26 may comprise only a portion of the housing 12 or that it may comprise the entire housing and remain within the scope of this disclosure.

As illustrated in FIG. 1, the ultraviolet light source 66 is positioned to emit ultraviolet light into the interior space 14 of the housing 12 toward the outlet end 20 thereof and just beyond the terminal end 28 of the ultrasonic horn 32. Wastewater passing through the interior space 14 of the housing 12 adjacent the ultraviolet light source 66 is first highly energized (e.g., at least agitated and more suitably subjected to cavitation) by the ultrasonic horn 32. While the ultraviolet is deflected or otherwise irradiated throughout the interior space 14 of the housing 12, the most intense region of ultraviolet light is generally adjacent the outlet end 20 of the housing. It is contemplated that a baffling system (not shown) can be disposed within the interior space 14 of the housing 12 adjacent the outlet end 20 thereof to provide a torturous flow path for the wastewater thereby increasing the dwell time during which the wastewater is subjected to ultraviolet light.

In one suitable embodiment, the ultraviolet light source 66 is operable to emit ultraviolet light at a wavelength in the range of about 172 nanometers and about 600 nanometers. More suitably, e.g., the light source 66 is operable to emit light at a wavelength in the range of about 172 nanometers to about 300 nanometers where the liquid to be treated is relatively colorless or near colorless. In another suitable embodiment, the ultraviolet light source 66 is operable to emit ultraviolet light at a wavelength in the range of about 300 nanometers to about 600 nanometers for liquids having color (e.g., waste streams having dye therein) and highly viscous liquids or semi-liquids (e.g., sludge). The ultraviolet light source 66 is operatively connected to a suitable power supply unit 70 for supplying sufficient electrical power to the ultraviolet light source to generate and emit ultraviolet light into the interior space 14 of the housing 12.

In the illustrated embodiment, the liquid treatment system 10 more particularly comprises an oxidizing agent source for delivering an oxidizing agent into the interior space 14 of the housing 12. In one suitable embodiment, e.g., hydrogen peroxide and ozone are each delivered into the interior space 14 of the housing 12. The hydrogen peroxide is delivered using a suitable pump 72, which draws hydrogen peroxide from a supply container 74 and delivers the hydrogen peroxide through a hydrogen peroxide inlet port 76 into the interior space 14 of the housing 12. Hydrogen peroxide ($H_2O_2$) decomposes to hydroxyl radicals (.OH), as shown below. The hydroxyl radical is an aggressive oxidant that reacts with organics.

$$H_2O_2 \rightarrow 2(.OH)$$

An ozone generator 80 is provided in the liquid treatment system 10 to generate ozone for delivery into the interior space 14 of the housing 12 through an ozone inlet port 82. Ozone ($O_3$) decomposes in water to form a superoxide radical ion ($O_2^-$), which is a strong oxidizing agent, and a hydroperoxide radical ($O_2H$). The hydroperoxide radical further decomposes to form another superoxide radical ion ($O_2^-$) and a hydrogen ion ($H^+$).

$$O_3 + OH^- \rightarrow O_2^- + O_2H$$

$$O_2H \leftrightarrow O_2^- + H^+$$

It is contemplated that either one of the hydrogen peroxide and the ozone may be used by itself in the liquid treatment system 10 within the scope of this disclosure. It is also contemplated that other oxidation agents may be used or that, in some embodiments, the oxidation agents may be omitted altogether.

The inlet end 18 of the housing 12 is in fluid communication with a suitable delivery system that is operable to direct the wastewater into, and more suitably through, the interior space 14 of the housing 12 from a continuous source 86. In one suitable embodiment, the delivery system comprises one or more pumps 88 (one pump being illustrated in FIG. 1) operable to pump the wastewater from the continuous source 86 thereof to the inlet end 18 of the housing 12 via suitable conduits (not shown). It is understood that the delivery system may be configured to deliver wastewater from more than one source 86, such as when mixing wastewaters, to the housing without departing from the scope of this disclosure. It is also contemplated that delivery systems other than that illustrated in FIG. 1 and described herein may be used to deliver wastewater to the inlet end 18 of the housing 12 without departing from the scope of this disclosure.

In one suitable embodiment, the liquid treatment system 10 is suitable for use in a continuous flow process wherein wastewater continuously flows through the system. For example, in one specific application, as noted above, wastewater is treated to kill, remove, and/or oxidize microorganisms prior to being disposed. The liquid treatment system 10 of the present disclosure may accomplish this through emitting ultraviolet light to the wastewater while the wastewater is cavitated, which is caused by the ultrasonic horn 32. As mentioned above, sparging of ozone gas into the housing and/or the addition of hydrogen peroxide can also be used. It is contemplated, though, that the liquid treatment system 10 may be used in a liquid treatment system in which wastewater is treated in accordance with a batch process instead of a continuous flow process and remain within the scope of this disclosure.

In operation according to one embodiment of the liquid treatment system 10 of the present disclosure, the liquid treatment system is used to treat microorganisms in a wastewater. Specifically, the wastewater is delivered (e.g., by the pump 88 described above) via conduits to one or more inlet ports 22 formed in the housing 12. Ozone and hydrogen peroxide are delivered in the housing 12 to mix with the wastewater. As the wastewater enters the interior space 14 of the housing 12 via the inlet port 22, the orientation of the inlet port can induce a relatively swirling action thereby mixing the ozone, hydrogen peroxide, and wastewater together to form a wastewater solution.

The wastewater solution flows upward within the interior space 14 of the housing 12 and past the waveguide assembly 16, and more particularly the ultrasonic horn 32. The ultrasonic horn 32 is driven by the drive system to vibrate at a predetermined ultrasonic frequency. In response to ultrasonic excitation of the ultrasonic horn 32, the agitating members 50, 50' that extend outward from the outer surface 34 of the ultrasonic horn dynamically flex/bend relative to the ultrasonic horn, or displace transversely (depending on the longitudinal position of the agitating member relative to the nodal region of the ultrasonic horn).

The wastewater flows longitudinally upward along the flow path 38 between the outer surface 34 of the ultrasonic horn 32 and the inner surface 36 of the housing's sidewall 30 so that the ultrasonic vibration and the dynamic motion of the agitating members 50, 50' agitate the wastewater and more suitably cause cavitation in the wastewater. The baffle members 62 of the baffle assembly 60 disrupt the longitudinal flow of the wastewater along the inner surface 36 of the housing's sidewall 30 and repeatedly direct the flow transversely inward to flow over the vibrating agitating members. As mentioned above, the ultrasonic horn 32 causes the cavitation in the wastewater solution which expedites the desired oxidation reactions. The sonochemistry caused by the ultrasonic horn 32 accelerates and enhances the decomposition of the hydrogen peroxide and ozone to form the above-described radicals, which are used to treat impurities in the wastewater. The wastewater solution, while it is cavitated (i.e., energized), flows past the ultraviolet light source 66. The ultraviolet light source 66 irradiates the wastewater for further treatment.

The use of ultraviolet light in this system 10 increases the efficiency and the efficacy of the degradation of the impurities in the wastewater. First, the ultraviolet light photochemically cleaves some of the ozone and peroxide agents to produce higher concentrations of the superoxide and radicals which work in conjunction with the sonochemistry to break down the impurities in the wastewater. Secondly, the nature of the high energy ultraviolet light starts the breakdown of the impurities by their absorption of the radiation followed by scission of the chemical bonds. For example, with respect to dyes and other colored agents, the sonochemistry will further breakdown these compound fragments, due to these intermediates being chemically unstable and therefore it is easier for them to undergo further degradation in the ultrasonic system.

An ultraviolet lamp of the ultraviolet light source 66 can be adjusted to produce either a broad ultraviolet light emission or specific narrower wavelength range by careful selection of the lamp bulb. For example, Fusion UV Systems, Inc. of Gaithersburg, Md. offers a series of ultraviolet lamp bulbs with the following emission ranges:

H-bulb 210-315 nanometers
D-bulb 350-450 nanometers
V-bulb 400-450 nanometers
M-bulb 365 nanometers and 406 nanometers.

The liquid treatment system 10 may also optionally be combined with a post-processing system in fluid communication with the outlet end 20 of the housing for processing the wastewater after the wastewater exits the housing. For example, the illustrated liquid treatment system 10 may be combined with one or more pressure gauges to monitor the pressure in the housing 12. One or more filter units 90 may also be disposed along the flow path of the wastewater downstream of the housing 12 to filter out particulate material, such as dirt, debris or other contaminates that may be present in the wastewater. For example, in the one embodiment, a first filter unit may be constructed to filter out particles sized greater than about 0.5 microns and a second filter unit downstream from the first filter unit is constructed to further filter out particles sized greater than about 0.2 microns. It is understood, however, that only one, or more than two filter units may be used, or that the filter units may be omitted altogether.

The post-processing system may further comprise a degassing and bubble removal unit 92 that is operable to remove gas bubbles from the wastewater after passing through the housing 12. In one suitable embodiment, the degassing and bubble removal unit 92 comprises a conventional membrane contactor. The construction and operation of membrane contactors is well known to those skilled in the art and is therefore not described in further detail herein. One example of a suitable membrane contactor is that available from Membrana of Charlotte, N.C., U.S.A. under the trade name SuperPhobic. One or more sensor units may also be provided to monitor various characteristics of the wastewater such as, without limitation, pH, conductivity, viscosity, temperature, color, surface tension and other characteristics.

In one embodiment, such as when hydrogen peroxide is introduced into the housing 12 to be used as an oxidizing agent for removing impurities from the wastewater, the residual hydrogen peroxide may need to be removed from the exit stream by a post processing unit that reacts with the hydrogen peroxide. For example, this post processing unit may include a platinum or silver surface that decomposes any residual hydrogen peroxide. Similarly, when ozone is introduced to aid in the removal of impurities, a post processing unit, such as a destruct unit, may be used to decompose any ozone exiting the housing.

Following treatment in the housing 12 or, if used, post-processing, the treated wastewater may be directed to a storage container, reused, or discharged to a suitable location.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A liquid treatment system comprising:
a housing defining an interior space, the housing having at least one inlet port for receiving liquid into the interior space of the housing and at least one outlet port for allowing liquid to exit the interior space of the housing, the outlet port being spaced from the inlet port so that liquid flows in a flow path through the interior space of the housing from the inlet port to the outlet port;
an ultrasonic waveguide assembly disposed within the interior space of the housing and comprising an ultrasonic horn disposed at least in part intermediate the inlet port and the outlet port of the housing and aligned coaxially with the housing, the ultrasonic horn being operable at an ultrasonic frequency to ultrasonically energize liquid flowing from the inlet port to the outlet port within the housing, wherein the ultrasonic horn has an outer surface and a plurality of discrete agitating members extending at least in part transversely outward from the outer surface, and wherein the housing has an inlet end and the ultrasonic waveguide assembly extends longitudinally from the inlet end of the housing into the interior space of the housing;
a baffle assembly suitably disposed within the interior space of the housing and in a transversely opposed relationship with the ultrasonic horn and the flow path; and
an ultraviolet light source for emitting ultraviolet light into the interior space of the housing to treat liquid flowing from the inlet port to the outlet port.

2. The liquid treatment system set forth in claim 1 wherein the ultraviolet light source is capable of emitting ultraviolet light at a wavelength in the range of about 172 nanometers to about 600 nanometers.

3. The liquid treatment system set forth in claim 2 wherein the ultraviolet light source is capable of emitting ultraviolet light at a wavelength in the range of about 172 nanometers to about 300 nanometers.

4. The liquid treatment system set forth in claim 2 wherein the ultraviolet light source is capable of emitting ultraviolet light at a wavelength in the range of about 300 nanometers to about 600 nanometers.

5. The liquid treatment system set forth in claim 1 wherein at least a portion of the housing comprises a transparent material for allowing ultraviolet light to irradiate through the housing into the interior space thereof to treat liquid in the interior space of the housing.

6. The liquid treatment system set forth in claim 5 wherein the ultraviolet light source is disposed exterior of the housing and adjacent the transparent portion of the housing.

7. The liquid treatment system set forth in claim 5 wherein the transparent material comprises a quartz glass.

8. The liquid treatment system set forth in claim 1 wherein the housing has a length, the ultraviolet light source being capable of emitting ultraviolet light along the length of the housing.

9. The liquid treatment system set forth in claim 1 further comprising at least one reflector for redirecting the ultraviolet light emitted by the ultraviolet light source within the interior space of the housing.

10. The liquid treatment system set forth in claim 1 further comprising an oxidizing agent source for introducing an oxidizing agent into the liquid.

11. The liquid treatment system set forth in claim 10 wherein the oxidizing agent source comprises a pump for pumping the oxidizing agent into the interior space of the housing.

12. The liquid treatment system set forth in claim 11 wherein the oxidizing agent source comprises a first pump for pumping a first oxidizing agent into the interior space of the housing, and a second pump for pumping a second oxidizing agent into the interior space of the housing, the first oxidizing agent being different than the second oxidizing agent.

13. The liquid treatment system set forth in claim 10 wherein the oxidizing agent comprises at least one of hydrogen peroxide and ozone.

14. The liquid treatment system set forth in claim 10 wherein the oxidizing agent source comprises an ozone generator and the oxidizing agent comprises ozone.

15. The liquid treatment system set forth in claim 1 wherein the baffle assembly comprises a plurality of baffle members.

16. The liquid treatment system set forth in claim 1 wherein at least one of the agitating members has a T-shape.

17. The liquid treatment system set forth in claim 16 wherein the T-shaped agitating member is disposed at a nodal region of the ultrasonic horn.

* * * * *